United States Patent
Yang et al.

(10) Patent No.: US 11,403,835 B2
(45) Date of Patent: Aug. 2, 2022

(54) METHOD AND DEVICE FOR PROCESSING FEATURE POINT OF IMAGE

(71) Applicant: Beijing Bytedance Network Technology Co., Ltd., Beijing (CN)

(72) Inventors: Cheng Yang, Beijing (CN); Yi He, Beijing (CN); Lei Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/981,226

(22) PCT Filed: Dec. 10, 2018

(86) PCT No.: PCT/CN2018/120063
§ 371 (c)(1),
(2) Date: Sep. 15, 2020

(87) PCT Pub. No.: WO2020/052120
PCT Pub. Date: Mar. 19, 2020

(65) Prior Publication Data
US 2021/0357673 A1    Nov. 18, 2021

(30) Foreign Application Priority Data
Sep. 12, 2018   (CN) .......................... 201811060983.2

(51) Int. Cl.
*G06V 10/22* (2022.01)
*G06V 10/50* (2022.01)
*G06K 9/62* (2022.01)

(52) U.S. Cl.
CPC ........... *G06V 10/22* (2022.01); *G06K 9/6201* (2013.01); *G06V 10/50* (2022.01)

(58) Field of Classification Search
CPC .. G06K 9/2054; G06K 9/4642; G06K 9/6201; G06K 9/46; G06K 9/4609; G06T 7/00
See application file for complete search history.

(56) References Cited

U.S. PATENT DOCUMENTS

| | | | |
|---|---|---|---|
| 2002/0090133 A1* | 7/2002 | Kim | G06T 7/90 382/164 |
| 2003/0053663 A1 | 3/2003 | Chen et al. | |

(Continued)

FOREIGN PATENT DOCUMENTS

| | | |
|---|---|---|
| CN | 103946891 A | 7/2014 |
| CN | 106778767 A | 5/2017 |

(Continued)

OTHER PUBLICATIONS

International Patent Application No. PCT/CN2018/120063; Int'l Search Report; dated May 29, 2019; 2 pages.

*Primary Examiner* — Ming Y Hon
(74) *Attorney, Agent, or Firm* — BakerHostetler

(57) ABSTRACT

A method and a device for processing feature points of an image are provided. A specific embodiment of the method includes obtaining an image to be processed; determining weights of the feature points of the image to be processed to obtain a weight set; and according to the weights, selecting target numbered feature points as target feature points of the image to be processed. The weights include a texture weight; the texture weight and a color change scope of pixels in a target sized image region in which the feature points locate are directly proportional. The embodiment can reduce the number of feature points of the image, and further release the storage pressure of feature points regarding the image.

17 Claims, 4 Drawing Sheets

(56) References Cited

U.S. PATENT DOCUMENTS

| | | | | |
|---|---|---|---|---|
| 2011/0305399 A1* | 12/2011 | Zitnick | ............... | G06F 16/5838 382/225 |
| 2013/0064452 A1* | 3/2013 | Chang | ..................... | G06T 1/60 382/190 |
| 2013/0307936 A1* | 11/2013 | Kim | ..................... | G06T 7/593 348/47 |
| 2014/0050411 A1* | 2/2014 | Lee | ..................... | G06K 9/4671 382/201 |
| 2014/0161346 A1* | 6/2014 | Ishiyama | ........... | G06K 9/00308 382/154 |
| 2014/0301647 A1* | 10/2014 | Mase | ................ | G06K 9/4671 382/195 |
| 2014/0328543 A1* | 11/2014 | Iwamoto | .............. | G06K 9/4671 382/201 |
| 2016/0259815 A1* | 9/2016 | Song | ................... | G06K 9/6201 |
| 2017/0270678 A1* | 9/2017 | Masumoto | ................ | G06T 7/33 |
| 2019/0265734 A1* | 8/2019 | Liu | ..................... | G05D 1/106 |

FOREIGN PATENT DOCUMENTS

| | | |
|---|---|---|
| CN | 108021921 A | 5/2018 |
| CN | 108170751 A | 6/2018 |
| EP | 2372605 A2 | 10/2011 |
| WO | WO 2017/216582 A1 | 12/2017 |

\* cited by examiner

METHOD AND DEVICE FOR PROCESSING FEATURE POINT OF IMAGE

CROSS-REFERENCE TO RELATED APPLICATION

The disclosure is the U.S. National Stage of International Application No. PCT/CN2018/120063, filed on Dec. 10, 2018, which claims the priority benefit of CN application Ser. No. 201811060983.2, filed on Sep. 12, 2018, titled "METHOD AND DEVICE FOR PROCESSING FEATURE POINT OF IMAGE". The entirety of the above-mentioned patent application will be hereby incorporated by reference herein and made a part of this specification.

TECHNICAL FIELD

The disclosure relates to a computer technical field, and more particularly to a method and a device for processing feature points of an image.

BACKGROUND

For one image, the number of feature points of the image extracted by an existing feature point extraction algorithm of various images is generally large. Therefore, in a scene of extracting the feature points of a large number of images, the storage pressure is correspondingly high.

SUMMARY

Embodiments of the disclosure provide a method and a device for processing feature points of an image.

In a first aspect, an embodiment of the disclosure provides a method for processing feature points of an image. The method includes obtaining an image to be processed; determining weights of the feature points of the image to be processed to obtain a weight set; and according to the weights, selecting target numbered feature points as target feature points of the image to be processed. The weights include a texture weight; the texture weight and a color change scope of pixels in a target sized image region in which the feature points locate are directly proportional.

In some embodiments, the process of according to the weights, selecting target numbered feature points as target feature points of the image to be processed includes: selecting the target numbered feature points as the target feature points of the image to be processed in a descending order of the weights.

In some embodiments, the weights further include a feature weight; the feature weight includes a response weight and/or a distance weight; the response weight and a response intensity of the feature points are directly proportional; the distance weight indicates a distance between the feature points and a central point of the image; the distance weight and the distance between the feature points and the central point of the image are inversely proportional; and the process of according to the weights, selecting target numbered feature points as target feature points of the image to be processed includes: according to the texture weight and the feature weight, determining a target weight of the feature points; and according to the target weight, selecting the target numbered feature points as the target feature points of the image to be processed.

In some embodiments, aiming at the weights in the weight set, the texture weight contained in the weights is determined by: determining a cumulative histogram of the target sized image region in which feature points locate corresponding to the weights therein; determining a total area of the cumulative histogram; determining a line connecting a point whose value is minimal and a point whose value is maximal in the cumulative histogram, and determining an area of a region formed by the line and coordinate axes to be a first area; determining a ratio of the total area to the first area; and according to the ratio, determining the texture weight comprised in the weights. The ratio and the texture weight contained in the weights are directly proportional.

In some embodiments, the method further includes: obtaining feature descriptors of the target feature points to acquire a feature descriptor set; aiming at the feature descriptors in the feature descriptor set, converting the feature descriptors to be an integer value; and aiming at the feature descriptors in the feature descriptor set, obtaining position coordinates of feature points corresponding to the feature descriptors in the image to be processed; correlatively storing the position coordinates and the feature descriptors.

In a second aspect, an embodiment of the disclosure provides a device for processing feature points of an image. The device includes an obtaining unit disposed to obtain an image to be processed, a determining unit disposed to determine weights of the feature points of the image to be processed to obtain a weight set and a selecting unit disposed to select target numbered feature points as target feature points of the image to be processed according to the weights. The weights include a texture weight; the texture weight and a color change scope of pixels in a target sized image region in which the feature points locate are directly proportional.

In some embodiments, the selecting unit is further disposed to: select the target numbered feature points as the target feature points of the image to be processed in a descending order of the weights.

In some embodiments, the weights further include a feature weight; the feature weight includes a response weight and/or a distance weight; the response weight and a response intensity of the feature points are directly proportional; the distance weight indicates a distance between the feature points and a central point of the image; the distance weight and the distance between the feature points and the central point of the image are inversely proportional; and the selecting unit is further disposed to: according to the texture weight and the feature weight, determine a target weight of the feature points; and according to the target weight, select the target numbered feature points as the target feature points of the image to be processed.

In some embodiments, aiming at the weights in the weight set, the texture weight contained in the weights is determined by: determining a cumulative histogram of the target sized image region in which feature points locate corresponding to the weights therein; determining a total area of the cumulative histogram; determining a line connecting a point whose value is minimal and a point whose value is maximal in the cumulative histogram, and determining an area of a region formed by the line and coordinate axes to be a first area; determining a ratio of the total area to the first area; and according to the ratio, determining the texture weight comprised in the weights; the ratio and the texture weight contained in the weights are directly proportional.

In some embodiments, the device further includes a storing unit, disposed to: obtain feature descriptors of the target feature points to acquire a feature descriptor set; aiming at the feature descriptors in the feature descriptor set, convert the feature descriptors to be an integer value; and aiming at the feature descriptors in the feature descriptor set, obtain position coordinates of feature points corresponding to the feature descriptors in the image to be processed; correlatively store the position coordinates and the feature descriptors.

In a third aspect, an embodiment of the disclosure provides a method for matching images. The method includes obtaining a first image and a second image; respectively determining target feature points of the first image and target feature points of the second image utilizing the method according to any one of claims 1-4; and matching the first image and the second image utilizing the target feature points of the first image and the target feature points of the second image.

In some embodiments, the process of matching the first image and the second image utilizing the target feature points of the first image and the target feature points of the second image includes: obtaining feature descriptors of the target feature points of the first image to acquire a first feature descriptor set; obtaining feature descriptors of the target feature points of the second image to acquire a second feature descriptor set; aiming at the first feature descriptors in the first feature descriptor set, converting the first feature descriptors into an integer value; aiming at the first feature descriptors in the second feature descriptor set, converting the second feature descriptors into an integer value; and matching the first image and the second image by the integer value corresponding to the target feature points of the first image and the integer value corresponding to the target feature points of the second image.

In a fourth aspect, an embodiment of the disclosure provides an electronic device. The electronic device includes one or more processors and a storage device stored with one or more programs therein; and when the one or more programs are executed by the one or more processors, the one or more processors perform any method in the first aspect.

In a fifth aspect, an embodiment of the disclosure provides a computer readable medium, stored with a computer program therein. The computer program is executed by a processor to perform any method according to the first aspect.

According to the method and the device for processing feature points of an image provided by the embodiments of the disclosure, the image to be processed is obtained; weights of the feature points of the image to be processed are determined to obtain a weight set; the weights include a texture weight; the texture weight and a color change scope of pixels in a target sized image region in which the feature points locate are directly proportional; according to the weights, target numbered feature points are selected as target feature points of the image to be processed, thereby determining the weight of the feature point according to the color change scope of pixels around each feature point, and according to the weight, the target feature point is selected from the feature points of the image, which can reduce the amount of feature points of the image, and further release the storage pressure of feature points regarding the image.

BRIEF DESCRIPTION OF THE DRAWINGS

According to the detailed description of unlimited embodiments with reference to figures as below, other features, objectives and advantages of the disclosure will be more obvious.

DETAILED DESCRIPTION

The present application will be further described in detail in combination with accompanying drawings and embodiments. It should be understood that specific embodiments described herein are only for the purpose of explanation of the relevant invention, rather than to limit the invention. It should also be noted that, for convenience of description, only portions related to the relevant invention are shown in the accompanying drawings.

It should be noted that, in the case of no conflict, the embodiments of the present application and features of the embodiments can be combined with each other. The present application will be described in detail below with reference to the accompanying drawings in combination with the embodiments.

Figure 1:
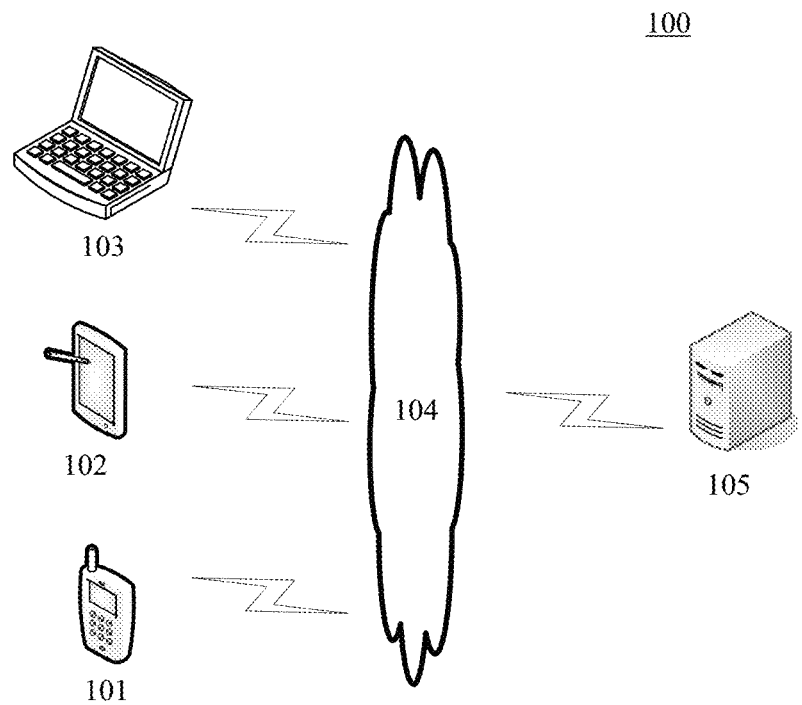
FIG. 1 is an exemplary system architecture diagram applied with an embodiment of the disclosure.

FIG. 1 shows an exemplary architecture 100 able to employ a method for processing feature points of an image or a device for processing feature points of an image of an embodiment of the disclosure.

As shown in FIG. 1, system architecture 100 may comprise terminal equipment 101, 102 and 103, a network 104 and a server 105. The network 104 is used for providing a medium of a communication link between the terminal equipment 101, 102 and 103 and the server 105. The network 104 may comprise various connection types, such as wired and wireless communication links or an optical fiber.

The terminal equipment 101, 102 and 103 interact with the server 105 via the network 104 to receive or send messages. Various client applications, such as web browser applications, shopping applications, search applications, instant messaging tools, social platform software and image applications, can be installed in the terminal equipment 101, 102 and 103.

The terminal equipment 101, 102 and 103 may be hardware or software. When being hardware, the terminal equipment 101, 102 and 103 may be various kinds of electronic equipment capable of supporting image storage and image processing, including but not limited to smart phones, tablet personal computers, e-book readers, laptop portable computers, desk computers, etc. When being software, the terminal equipment 101, 102 and 103 can be installed in the electronic equipment listed above. The terminal equipment may be implemented as multiple pieces of software or software modules (such as multiple pieces of software or software modules used for providing distributed service), may also be implemented as a single piece of software or software module, which is not limited herein.

The server 105 may be the one for providing various services, such as an image processing server used for extracting feature points of images to be processed sent by the terminal equipment 101, 102 and 103.

It should be noted that the above images to be processed may also be directly locally stored in the server 105, so that the server 105 may directly extract the locally stored images to be processed for processing, at the moment, the images to be processed may be not stored in the terminal equipment 101, 102 and 103 and the network 104.

It should be noted that a method for processing feature points of images provided by an embodiment of the present application is generally executed by the server 105, and correspondingly, a device for processing feature points of images is generally arranged in the server 105.

It should also be noted that image processing applications may be installed in the terminal equipment 101, 102 and 103; the terminal equipment 101, 102 and 103 may also process images to be processed based on the image processing applications, at the moment, the method for processing the feature points of the images may also be executed by the terminal equipment 101, 102 and 103, and correspondingly, the device for processing the feature points of the images may also be arranged in the terminal equipment 101, 102 and 103. At the moment, the exemplary system architecture 100 may not comprise the server 105 and the network 104.

It should be noted that the server 105 may be hardware or software. When being hardware, the server 105 may be implemented as a distributed server cluster including a plurality of servers, and may also be implemented as the single server. When being software, the server 105 may be implemented as multiple pieces of software or software modules (such as multiple pieces of software or software modules used for providing distributed service), and may also be implemented as a single piece of software or software module, which is not limited herein.

It should be understood that numbers of the terminal equipment, the network and the server in FIG. 1 are exemplary only. Any number of terminal equipment, networks and servers may be provided according to implementation requirements.

Figure 2:
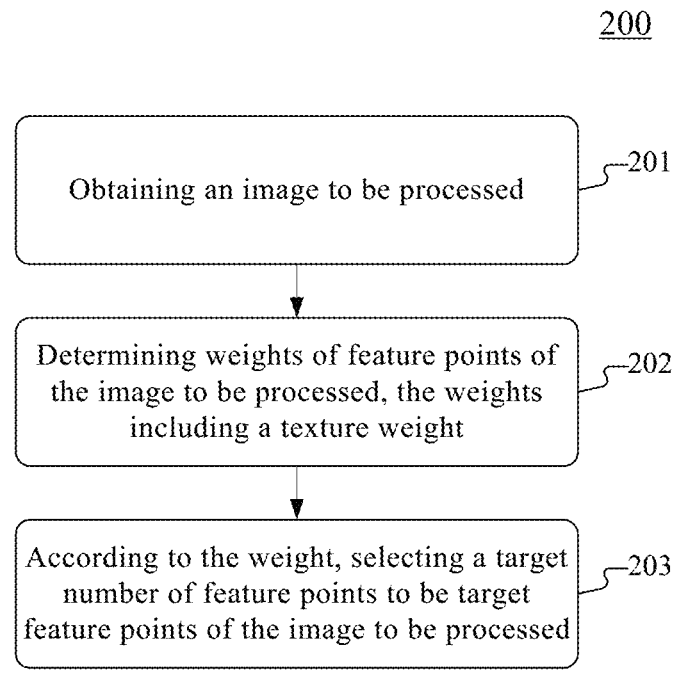
FIG. 2 is a flowchart of a method for processing feature points of an image according to an embodiment of the disclosure.

Referring to FIG. 2, FIG. 2 shows a flowchart 200 of a method for processing feature points of an image according to an embodiment of the disclosure. The method for processing feature points of an image includes following steps.

Step 201, an image to be processed is obtained.

In the embodiment, an executive body (as a server 105 shown in FIG. 1) of the method for processing feature points of an image can first obtain the image to be processed from local or other storage devices.

Step 202, weights of feature points of the image to be processed are determined to obtain a weight set. The weights include a texture weight.

In the embodiment, the feature point of an image can indicate a point where the grayscale value of the image is significantly varied or a point whose curvature on the image border is relatively large (namely a point of intersection of two borders). The feature point of an image can reflect the essence feature of the image and identify the target object in the image. The match of images can be done by matching the feature point.

In the embodiment, the texture weight can be configured for representing color change scope of pixels in an image region with a target size where contains a feature point, and is directly proportional to the color change scope of pixels in an image region with a target size where contains a feature point. The target size can be disposed by a person skilled in the art, or determined according to the image to be processed (such as disposing according to the resolution of the image to be processed), or assigning according to a specific application scenario. A texture weight of any feature point of an image can be determined by various methods.

Optionally, the weight of a feature point can be determined by following steps. First, a mean value of color values of pixels in the image region with the target size around the feature point is calculated. Then, a difference value of the mean value and a color value of the feature point is calculated. Last, the weight of the feature point is determined according to the calculated difference value. The larger the difference value, the larger the corresponding weight will be.

Optionally, aiming at weights in the weight set, the texture weight included in the weights can be determined by following steps.

Step 1) a cumulative histogram of an image region with a target size where contains a feature point corresponding to the weight is determined.

In the step, color information of each pixel in the image region with the target size where contains the feature point corresponding to the weight can be collected, and a corresponding cumulative histogram can be generated by a conventional application that makes a cumulative histogram. For instance, the cumulative histogram as shown in FIG. 3 can be referred, which is configured for representing cumulative probability distribution of grayscale values in the figure.

Step 2) a total area of the cumulative histogram is determined.

Figure 3:
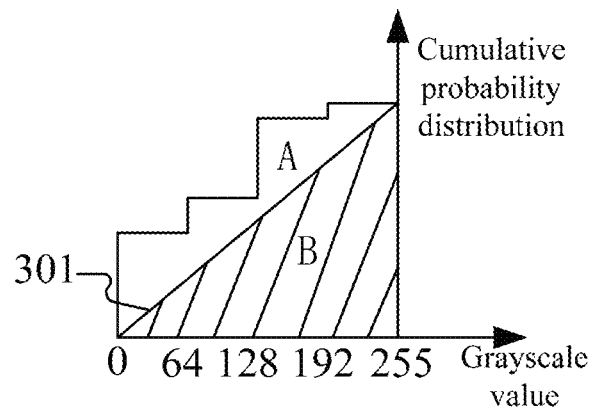
FIG. 3 is a schematic view of a cumulative histogram of a method for processing feature points of an image according to an embodiment of the disclosure.

In the step, taking the cumulative histogram in FIG. 3 as an example, the total area is the sum of areas of the region "A" and the region "B" in the figure.

Step 3) a line connecting a point whose value is minimal and a point whose value is maximal in the cumulative histogram is determined, and an area formed by the line and coordinate axes is determined to be a first area.

In the step, taking the cumulative histogram shown in FIG. 3 as an example, a line 301 connecting the point whose value is minimal and the point whose value is maximal is shown and marked therein. The line 301 and the coordinate axes form the region "B". Therefore, the area of the region "B" in FIG. 3 is the first area.

Step 4) a ratio of the total area to the first area is determined.

Step 5) according to the ratio, a texture weight included in the weights is determined. The ratio and the texture weight included in the weights are directly proportional.

Step 203, according to the weights, feature points whose amount is a target number are selected to be target feature points of the image to be processed.

In the embodiment, the target number can be predetermined, or determined according to a feature point number determination rule (such as the target number is one tenth of the total number of feature points of the image to be processed), or assigned by a person skilled in the art according to the practical requirement.

Optionally, it can screen according to a predetermined weight threshold; for instance, a feature point whose weight is more than the weight threshold can be selected to be the target feature point of the image to be processed.

Optionally, it further can select feature points whose amount is the target number according to weight distribution scope of each feature point. For instance, several weight ranges can be pre-disposed. According to the distribution of each weight within each weigh range, feature points can be respectively selected from each weight range to form feature points whose amount is the target number as the target feature points of the image to be processed.

Optionally, the target numbered feature points selected to be target feature points of the image to be processed can be based on an order from the maximal weight to the minimal weight.

The method provided by the forgoing embodiment of the disclosure determines the weight of the feature point according to the color change scope of pixels around the feature point of the image to be processed, and selects the target feature point from feature points of the image according to the weight, which can result in reducing the number of feature points in the image and further releasing storage pressure of feature points regarding the image.

Figure 4:
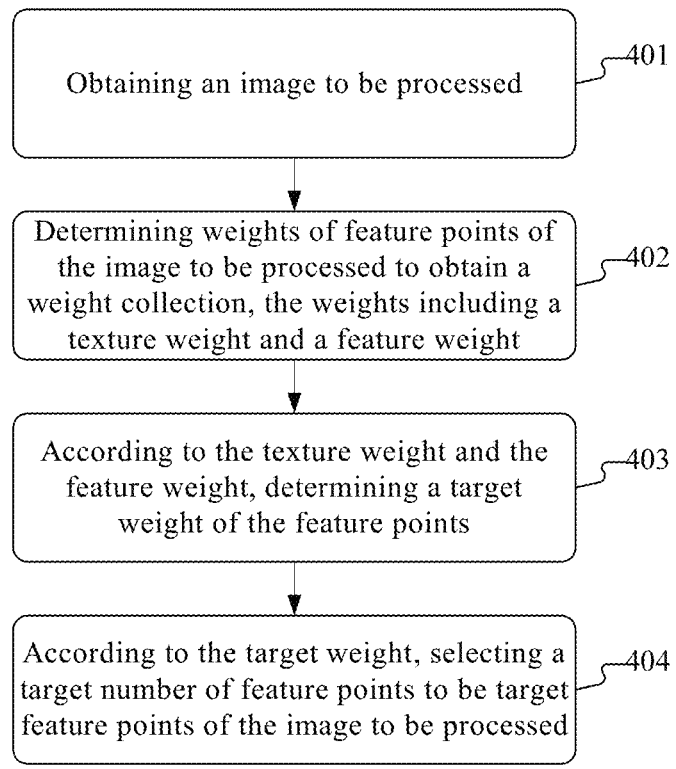
FIG. 4 is a flowchart of a method for processing feature points of an image according to another embodiment of the disclosure.

Referring to FIG. 4, FIG. 4 shows a flowchart of a method for processing feature points of an image according to another embodiment of the disclosure. The process 400 of the method for processing feature points of an image includes following steps.

Step 401, an image to be processed is obtained.

A specific process of the step can be referred to the relative illustration of step 201 in the embodiment corresponding to FIG. 2, which will not be repeated herein.

Step 402, weights of the image to be processed are determined to obtain a weight set. The weights include a texture weight and a feature weight.

In the embodiment, the feature weight includes a response weight and/or a distance weight. The response weight and a response weight of the feature point are directly proportional. The distance weight depicts a distance between the feature point and a center point of the image. The distance weight and the distance between the feature point and the center point of the image are inversely proportional.

The response intensity of the feature point is one of properties of the feature point. A feature descriptor of the feature point can be obtained by various feature extraction algorithms, thereby obtaining the response intensity of the feature point. The feature descriptor can be configured for describing an image. Specifically, the feature descriptor can be a feature vector or array. The response intensity can be an element in the feature descriptor.

The specific process of the texture feature in the step can be referred to the relative illustration of step 202 in the embodiment corresponding to FIG. 2, which will not be repeated herein.

Step 403, according to the texture weight and the feature weight, a target weight of the feature point is determined.

In the embodiment, the texture weight and the feature weight can be comprehensively considered to determine the target weight of the feature point.

Optionally, a sum of the texture weight and the feature weight can directly act as the target weight of the feature point.

Optionally, a weight sum of the texture weight and the feature weight further can act as the target weight of the feature point. Weight coefficients of the texture weight and the feature weight can be disposed by a person skilled in the art according to the requirement. Specifically, the response weight and the distance weight included in the texture weight and the feature weight can be respectively disposed with the weight coefficient. A sum of three weight coefficients can be disposed to be one.

Step 404, according to the target weight, target numbered feature points are selected to be the target feature points of the image to be processed.

Optionally, the selection can be based on a predetermined target weight threshold. For instance, the feature point whose target weight is more than the target weight threshold can be selected to be the target feature point of the image to be processed.

Optionally, target numbered feature points can further be selected according to the distribution scope of the target weights of each feature point. For instance, several target weight range can be predisposed. According to the distribution of each target weight in each target weight range, the feature point is selected from each target weight range to form target numbered feature points to be the target feature points of the image to be processed.

Optionally, the target numbered feature points can be selected in descending order of target weights to be the target feature points of the image to be processed.

Optionally in the embodiment, after selecting the target feature points, it further can obtain the feature descriptors of the target feature points, thereby achieving a feature descriptor set Aiming at the feature descriptors in the feature descriptor set, the feature descriptors can be converted to be an integer value. Subsequently, aiming at the feature descriptors in the feature descriptor set, position coordinates of feature points corresponding to the feature descriptors can be obtained, and the position coordinates and the feature points are correlatively stored.

The feature descriptor can be converted by some conventional algorithms able to convert the feature descriptor to the integer value, such as the product quantization (PQ) algorithm.

Figure 5:
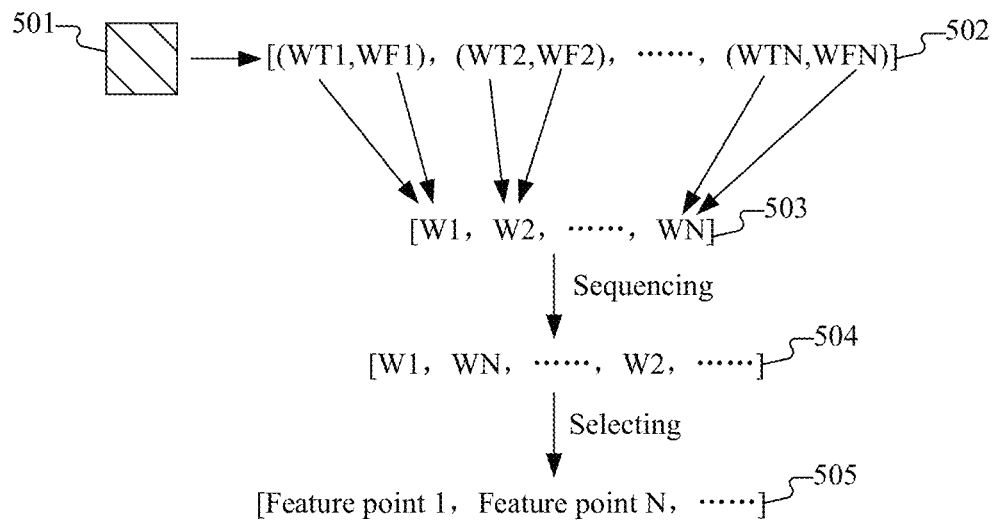
FIG. 5 is a schematic view of an application scenario of a method for processing feature points of an image according to an embodiment of the disclosure.

Referring to FIG. 5, FIG. 5 is a schematic view of an application scenario of a method for processing feature points of an image according to an embodiment of the disclosure. In the application scenario of FIG. 5, first a weight 502 of the feature point of an image 501 to be processed can be determined. Each weight of the feature point includes a texture weight WT and a feature weight WF. For instance, weights of the first feature point include a texture weight WT1 and a feature weight WF1; weights of the second feature point include a texture weight WT2 and a feature weight WF2; weights of the $N^{th}$ feature point include a texture weight WTN and a feature weight WFN.

Subsequently, a weight sum of the texture weight and the feature weight of each feature point can act as the target weight of each feature point to obtain a target weight set 503. Then, the target weights of feature points can be sequenced to obtain a sequenced target weight set 504.

Subsequently, according to the predetermined number, predetermined numbered feature points can be selected from the sequenced target weight set 504 to be the target feature points of the image 501 to be processed (as 505 shown in the figure).

It can be seen from FIG. 4, compared with the embodiment corresponding to FIG. 2, the process 400 of the method for processing feature points of an image in the embodiment highlights the step that the weight of the feature point can comprehensively consider the texture weight and the feature weight. Therefore, the scheme described by the embodiment can determine the target weight according to the texture weight and the feature weight, and select the target feature point according to the target weight, which can simultaneously reduce the number of feature points of the image, release the storage pressure of feature points regarding the image, and guarantee the validity of the selected feature points.

Figure 6:
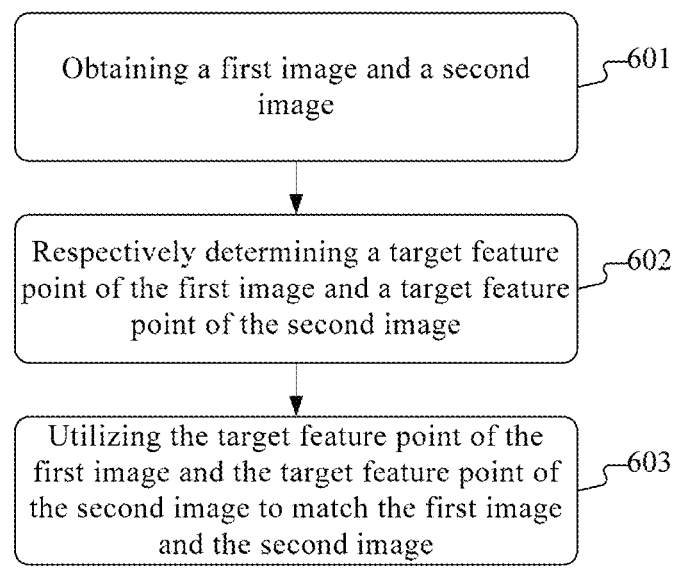
FIG. 6 is a flowchart of a method for matching an image according to an embodiment of the disclosure.

Referring to FIG. 6, FIG. 6 shows a process 600 of a method for matching an image according to an embodiment of the disclosure, which includes following steps.

S601, a first image and a second image are obtained.

In the embodiment, an executive body of the method for matching an image (as the server 105 shown in FIG. 1) can first obtain two images from local or other storage devices as the first image and the second image respectively. Conceivably, it further can obtain one image from local, and obtain the other image from a storage device.

Step 602, a target feature point of the first image and a target feature point of the second image are respectively determined.

In the embodiment, the target feature points of the first image and the second image can be respectively determined according to the methods described in the embodiments corresponding to FIG. 2 and FIG. 4.

Step 603, matching the first image and the second image according to the target feature point of the first image and the target feature point of the second image.

In the embodiment, based on the target feature point of the first image and the target feature point of the second image, the first image and the second image can be matched by various conventional feature point based image matching algorithms.

Optionally, feature descriptors of the target feature point of the first image can first be obtained to acquire a first feature descriptor set, and feature descriptors of the target feature point of the second image can first be obtained to acquire a second feature descriptor set. Subsequently, aiming at the first feature descriptors in the first feature descriptor set, the first feature descriptors can be converted to be an integer value; aiming at the second feature descriptors in the second feature descriptor set, the second feature descriptors can be converted to be an integer value. Then, the integer value corresponding to the target feature point of the first image and the integer value corresponding to the target feature point of the second image are utilized to match the first image and the second image.

The forgoing feature point based image match is a conventional art widely studied and applied at present, which will not be repeated herein.

The method for matching an image provided by the forgoing embodiment of the disclosure first respectively determines the target feature point of two images to be matched, then matches the two images according to the target feature point; compared with matching images based on all feature points extracted from two images in the conventional art, as the target feature point is first selected to reduce the number of feature points of two images, the subsequent image matching process can be accelerated. After determining the target feature point of two images to be matched, it can first convert the feature descriptor of each target feature point of each image to an integer value, and then match the images by the integer value corresponding to each feature point, which can further accelerate to match images and improve the efficiency of matching images.

Figure 7:
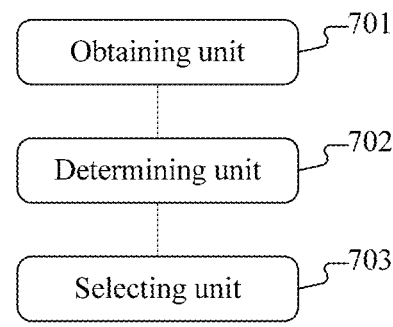
FIG. 7 is a structural schematic view of a device for processing an image according to an embodiment of the disclosure.

Referring to FIG. 7, as the implement of the methods as shown in forgoing figures, the disclosure provides an embodiment of a device for processing feature points of an image. The device embodiment is corresponding to the method embodiment shown as FIG. 2. The device specifically can be applied in various electronic devices.

As shown in FIG. 7, a device 700 for processing feature points of an image provided by the embodiment includes an obtaining unit 701, a determining unit 702 and a selecting unit 703. The obtaining unit 701 is disposed to obtain an image to be processed; the determining unit 702 is disposed to determine weights of feature points of the image to be processed to obtain a weight set. The weights include a texture weight. The texture weight and the color change scope of pixels in a target sized image region where the feature point is are directly proportional; the selecting unit 703 is disposed to select target numbered feature points to be target feature points of the image to be processed according to the weights.

In the embodiment, in the device 700 configured for processing feature points of an image, the specific process and technical effects of the obtaining unit 701, the determining unit 702 and the selecting unit 703 can respectively be referred to relative illustration of the step 201, the step 202 and the step 203 in the embodiment corresponding to FIG. 2, which will not be repeated herein.

In some optional embodiments, the forgoing selecting unit 703 can further be disposed to select target numbered feature points as target feature points of the image to be processed in descending order of weights.

In some optional embodiments, the weights further include a feature weight. The feature weight includes a response weight and/or a distance weight. The response weight and the response intensity of the feature point is directly proportional; the distance weight indicates a distance between the feature point and a center point of the image; the distance weight and the distance between the feature point and the center point of the image are inversely proportional; and the selecting unit 703 is further disposed to determine the target weight of the feature point according to the texture weight and the feature weight, and select target numbered feature points to be the target feature points of the image to be processed.

In some optional embodiments, aiming at the weights in the weight set, the texture weight included in the weights is achieved by determining a cumulative histogram of the target sized image region where the feature point is; determining a total area of the cumulative histogram; determining a line connecting a point whose value is minimal and a point whose value is maximal in the cumulative histogram, and determining an area of a region formed by the line and coordinate axes as a first area; determining a ratio of the total area to the first area; according to the ratio, determining the texture weight included in the weights. The ratio and the texture weight included in the weights are directly proportional.

In some embodiments, the device 700 configured for processing feature points of an image further includes a storing unit (not shown), which is disposed to obtain feature descriptors of the feature points to acquire a feature descriptor set; aiming at the feature descriptors in the feature descriptor set, the feature descriptors are converted to be an integer value; aiming at the feature descriptors in the feature descriptor set, position coordinates of feature points corresponding to the feature descriptors in the image to be processed are obtained; the position coordinates and the feature descriptors are correlatively stored.

The device provided by the forgoing embodiment of the disclosure obtains an image to be processed by the obtaining unit; the determining unit determines the weights of the feature points of the image to be processed to obtain the weight set. The weights include the texture weight. The texture weight and the color change scope of pixels in a target sized image region where the feature point is are directly proportional; the selecting unit selects target numbered feature points as target feature points of the image to be processed, thereby determining the weight of the feature point according to the color change scope of pixels around each feature point, and according to the weight, the target feature point is selected from the feature points of the image, which can reduce the amount of feature points of the image, and further release the storage pressure of feature points regarding the image.

Figure 8:
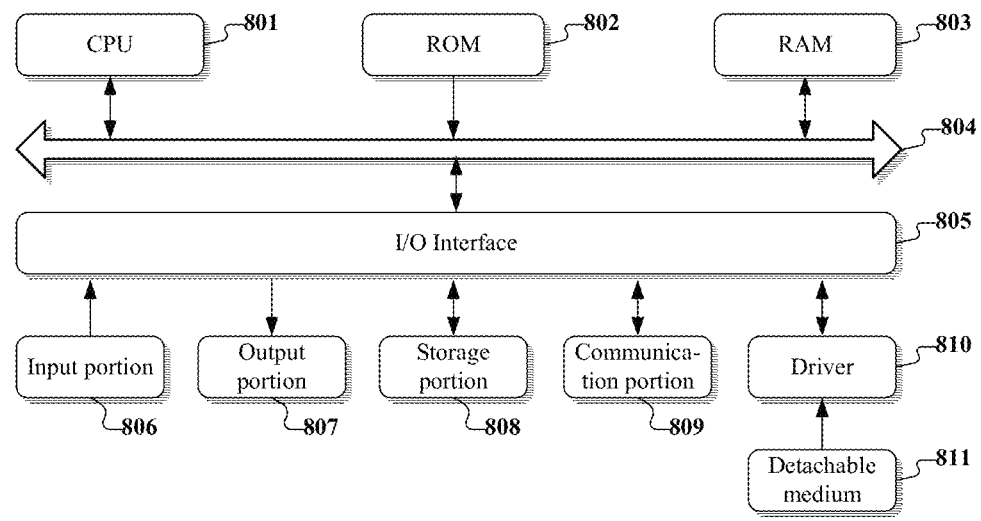
FIG. 8 is a structural schematic view of a computer system for implementing an electronic device adapted for an embodiment of the disclosure.

Reference is now made to FIG. 8 which shows a structure diagram of a computer system 800 of electronic equipment applicable to implementing an embodiment of the present application. The electronic equipment shown in FIG. 8 is merely an example and should not pose any limitation on functions and application ranges of the embodiments of the present application.

As shown in FIG. 8, the computer system 800 comprises a central processing unit (CPU) 801 which can execute various appropriate actions and processes according to programs stored in a read-only memory (ROM) 802 or programs loaded to a random-access memory (RAM) 803 from a storage portion 808. Various programs and data required by operation of the system 800 are also stored in the RAM 803. The CPU 801, ROM 802 and RAM 803 are connected to one another through a bus 804. An input/output (I/O) interface 805 is also connected to the bus 804.

The I/O interface 805 is connected with following components: an input portion 806 including a keyboard, a mouse, etc.; an output portion 807 including a cathode-ray tube (CRT), a liquid crystal display (LCD), a loudspeaker, etc.; a storage portion 808 including a hard disk, etc.; and a communication portion 809 including a network interface card such as an LAN card and a modem. The communication portion 809 executes communication through networks such as the Internet. A driver 810 is also connected to the I/O interface 805 as required. A detachable medium 811, such as a magnetic disk, an optical disk, a magneto-optical disk and a semiconductor memory, is installed on the driver 810 as required, so that computer programs read from the detachable medium can be installed into the storage portion 808 as required.

Specifically, processes described above with reference to flowcharts may be implemented as computer software programs in accordance with embodiments of the present disclosure. For example, an embodiment of the present application comprises a computer program product which comprises a computer program carried on a computer readable medium, and the computer program comprises program codes used for executing the method shown in the flowchart. In such embodiment, the computer program may be downloaded from the network through the communication portion 809 and installed, and/or downloaded from the detachable medium 811 and installed. When the computer program is executed by the central processing unit (CPU) 801, a function defined in the method provided by the present application is executed.

It should be noted that the computer readable medium of the present application may be a computer readable signal medium or a computer readable storage medium, or any combination of the computer readable signal medium or the computer readable storage medium. The computer readable storage medium may be, for example, but is not limited to, an electronic, magnetic, optical, electromagnetic, infrared, or semiconductor system, apparatus, or device, or combination of any of the above. More specifically, the computer readable storage medium may include, but is not limited to, an electrical connector having one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the above. In the present application, the computer readable storage medium may be any tangible medium that contains or stores a program that can be used by or in combination with an instruction execution system, apparatus, or device. In the present application, a computer readable signal medium may include a data signal propagating in a baseband or as a part of a carrier wave, wherein computer readable program codes are carried in the data signal. Such propagated data signal may be in various forms, including but not limited to an electromagnetic signal, an optical signal, or any appropriate combination of the above. The computer readable signal medium may also be any computer readable medium other than the computer readable storage medium, and the computer readable medium can transmit, propagate, or transport the program used by or in combination with the instruction execution system, apparatus, or device. The program codes included in the computer readable medium may be transmitted via any appropriate medium, including but not limited to wireless, electrical wires, optical cables, RF, etc., or any appropriate combination of the above.

The flowcharts and block diagrams in the figures illustrate the possible system architecture, functions, and operation of systems, methods, and computer program products according to various embodiments of the present application. In view of this, each block in the flowcharts or block diagrams may represent a module, a program segment, or a portion of codes, and the module, the program segment or the portion of codes contains one or more executable instructions for implementing specified logical functions. It should also be noted that in some alternative implementations, the functions labeled in the blocks may be implemented according to an order different from the order labeled in the figures. For example, the two blocks shown in succession may, in fact, be executed substantially concurrently, or may sometimes be executed in a reverse order, depending upon the functions involved. It should also be noted that each block in the block diagrams and/or flowcharts, and combinations of blocks in the block diagrams and/or flowcharts can be implemented by dedicated hardware-based systems used for carrying out the specified functions or operation, or can be implemented by combinations of dedicated hardware and computer instructions.

Units described in the embodiments of the present application may be implemented in a software mode or in a hardware mode. The described units may also be arranged in a processor, for example, the units can be described as follows: a processor comprises an acquisition unit, a determination unit, and a selecting unit, wherein the names of the units do not, in some cases, constitute limitation on the units themselves. For instance, the obtaining unit can be described as a unit for obtaining an image to be processed.

In another aspect, the present application also provides a computer readable medium which may be included in the electronic equipment described in the above embodiments, or may also present separately without being assembled into the electronic device. The above computer readable medium carries one or more programs. When one or more programs above are executed by the electronic device, the electronic device is enabled to obtain an image to be processed; determine weights of feature points of the image to be processed to obtain a weight set. The weights include a texture weight. The texture weight and the color change scope of pixels in a target sized image region where the feature point is are directly proportional; according to the weights, target numbered feature points are selected as target feature points of the image to be processed.

The above description is merely the illustration of preferred embodiments of the present application and the technical principles used. It should be understood by those skilled in the art that the scope of the present application referred to herein is not limited to technical solutions formed by specific combinations of the above technical features, but also contains other technical solutions formed by any combination of the above technical features or equivalent features thereof without departing from the above inventive concept, such as, technical solutions formed by interchanging the above features with (but not limited to) the technical features with similar functions disclosed in the present application.

What is claimed is:

1. A method for processing feature points of an image, comprising:
   obtaining an image to be processed;
   determining weights of the feature points of the image to be processed to obtain a weight set; wherein the weights comprise a texture weight; the texture weight and a color change scope of pixels in a target sized image region in which the feature points locate are directly proportional;
   according to the weights, selecting target numbered feature points as target feature points of the image to be processed;
   wherein the weights further comprise a feature weight, the feature weight comprises at least one of a response weight and a distance weight, the response weight and a response intensity of the feature points are directly proportional, the distance weight indicates a distance between the feature points and a central point of the image, and the distance weight and the distance between the feature points and the central point of the image are inversely proportional; and
   wherein the according to the weights, selecting target numbered feature points as target feature points of the image to be processed further comprises:
     according to the texture weight and the feature weight, determining a target weight of the feature points, and according to the target weight, selecting the target numbered feature points as the target feature points of the image to be processed.

2. The method according to claim 1, wherein the according to the weights, selecting target numbered feature points as target feature points of the image to be processed comprises:
   selecting the target numbered feature points as the target feature points of the image to be processed in a descending order of the weights.

3. The method according to claim 2, wherein the method further comprises: obtaining feature descriptors of the target feature points to acquire a feature descriptor set; aiming at the feature descriptors in the feature descriptor set, converting the feature descriptors to be an integer value; and
   aiming at the feature descriptors in the feature descriptor set, obtaining position coordinates of feature points corresponding to the feature descriptors in the image to be processed; correlatively storing the position coordinates and the feature descriptors.

4. The method according to claim 1, wherein aiming at the weights in the weight set, the texture weight comprised in the weights is determined by:
   determining a cumulative histogram of the target sized image region in which feature points locate corresponding to the weights therein;
   determining a total area of the cumulative histogram;
   determining a line connecting a point whose value is minimal and a point whose value is maximal in the cumulative histogram, and determining an area of a region formed by the line and coordinate axes to be a first area;
   determining a ratio of the total area to the first area; and
   according to the ratio, determining the texture weight comprised in the weights; wherein the ratio and the texture weight comprised in the weights are directly proportional.

5. The method according to claim 4, wherein the method further comprises: obtaining feature descriptors of the target feature points to acquire a feature descriptor set;
   aiming at the feature descriptors in the feature descriptor set, converting the feature descriptors to be an integer value; and
   aiming at the feature descriptors in the feature descriptor set, obtaining position coordinates of feature points corresponding to the feature descriptors in the image to be processed; correlatively storing the position coordinates and the feature descriptors.

6. The method according to claim 1, wherein the method further comprises:
   obtaining feature descriptors of the target feature points to acquire a feature descriptor set;
   aiming at the feature descriptors in the feature descriptor set, converting the feature descriptors to be an integer value; and
   aiming at the feature descriptors in the feature descriptor set, obtaining position coordinates of feature points corresponding to the feature descriptors in the image to be processed; correlatively storing the position coordinates and the feature descriptors.

7. The method according to claim 1, wherein the method further comprises: obtaining feature descriptors of the target feature points to acquire a feature descriptor set;
   aiming at the feature descriptors in the feature descriptor set, converting the feature descriptors to be an integer value; and
   aiming at the feature descriptors in the feature descriptor set, obtaining position coordinates of feature points corresponding to the feature descriptors in the image to be processed; correlatively storing the position coordinates and the feature descriptors.

8. A device for processing feature points of an image, comprising:
   at least one processor; and
   at least one memory communicatively coupled to the at least one processor and storing instructions that upon execution by the at least one processor cause the device to:
   obtain an image to be processed;
   determine weights of the feature points of the image to be processed to obtain a weight set; wherein the weights comprise a texture weight; the texture weight and a color change scope of pixels in a target sized image region in which the feature points locate are directly proportional;

select target numbered feature points as target feature points of the image to be processed according to the weights;

wherein the weights further comprise a feature weight, the feature weight comprises at least one of a response weight and a distance weight, the response weight and a response intensity of the feature points are directly proportional, the distance weight indicates a distance between the feature points and a central point of the image, and the distance weight and the distance between the feature points and the central point of the image are inversely proportional; and wherein the at least one memory further stores instructions that upon execution by the at least one processor cause the device to:

according to the texture weight and the feature weight, determine a target weight of the feature points, and according to the target weight, select the target numbered feature points as the target feature points of the image to be processed.

9. The device according to claim 8, wherein the at least one memory further stores instructions that upon execution by the at least one processor cause the device to:

select the target numbered feature points as the target feature points of the image to be processed in a descending order of the weights.

10. The device according to claim 9, wherein the at least one memory further stores instructions that upon execution by the at least one processor cause the device to:

obtain feature descriptors of the target feature points to acquire a feature descriptor set;

aiming at the feature descriptors in the feature descriptor set, convert the feature descriptors to be an integer value; and aiming at the feature descriptors in the feature descriptor set, obtain position coordinates of feature points corresponding to the feature descriptors in the image to be processed;

correlatively store the position coordinates and the feature descriptors.

11. The device according to claim 8, wherein aiming at the weights in the weight set, the texture weight comprised in the weights is determined by:

determining a cumulative histogram of the target sized image region in which feature points locate corresponding to the weights therein;

determining a total area of the cumulative histogram;

determining a line connecting a point whose value is minimal and a point whose value is maximal in the cumulative histogram, and determining an area of a region formed by the line and coordinate axes to be a first area;

determining a ratio of the total area to the first area; and according to the ratio, determining the texture weight comprised in the weights; wherein the ratio and the texture weight comprised in the weights are directly proportional.

12. The device according to claim 11, wherein the at least one memory further stores instructions that upon execution by the at least one processor cause the device to:

obtain feature descriptors of the target feature points to acquire a feature descriptor set;

aiming at the feature descriptors in the feature descriptor set, convert the feature descriptors to be an integer value; and aiming at the feature descriptors in the feature descriptor set, obtain position coordinates of feature points corresponding to the feature descriptors in the image to be processed;

correlatively store the position coordinates and the feature descriptors.

13. The device according to claim 8, wherein the at least one memory further stores instructions that upon execution by the at least one processor cause the device to:

obtain feature descriptors of the target feature points to acquire a feature descriptor set;

aiming at the feature descriptors in the feature descriptor set, convert the feature descriptors to be an integer value; and aiming at the feature descriptors in the feature descriptor set, obtain position coordinates of feature points corresponding to the feature descriptors in the image to be processed;

correlatively store the position coordinates and the feature descriptors.

14. The device according to claim 8, wherein the at least one memory further stores instructions that upon execution by the at least one processor cause the device to:

obtain feature descriptors of the target feature points to acquire a feature descriptor set;

aiming at the feature descriptors in the feature descriptor set, convert the feature descriptors to be an integer value; and aiming at the feature descriptors in the feature descriptor set, obtain position coordinates of feature points corresponding to the feature descriptors in the image to be processed;

correlatively store the position coordinates and the feature descriptors.

15. A method for matching images, comprising:

obtaining a first image and a second image;

respectively determining target feature points of the first image and target feature points of the second image utilizing operations of:

obtaining an image to be processed;

determining weights of the feature points of the image to be processed to obtain a weight set; wherein the weights comprise a texture weight; the texture weight and a color change scope of pixels in a target sized image region in which the feature points locate are directly proportional;

according to the weights, selecting target numbered feature points as target feature points of the image to be processed;

wherein the weights further comprise a feature weight, the feature weight comprises at least one of a response weight and a distance weight, the response weight and a response intensity of the feature points are directly proportional, the distance weight indicates a distance between the feature points and a central point of the image, and the distance weight and the distance between the feature points and the central point of the image are inversely proportional; and wherein the according to the weights, selecting target numbered feature points as target feature points of the image to be processed further comprises:

according to the texture weight and the feature weight, determining a target weight of the feature points, and according to the target weight, selecting the target numbered feature points as the target feature points of the image to be processed; and matching the first image and the second image utilizing the target feature points of the first image and the target feature points of the second image.

16. The method according to claim 15, wherein the matching the first image and the second image utilizing the target feature points of the first image and the target feature points of the second image comprises:

obtaining feature descriptors of the target feature points of the first image to acquire a first feature descriptor set;

obtaining feature descriptors of the target feature points of the second image to acquire a second feature descriptor set;

aiming at the first feature descriptors in the first feature descriptor set, converting the first feature descriptors into an integer value;

aiming at the first feature descriptors in the second feature descriptor set, converting the second feature descriptors into an integer value; and matching the first image and the second image by the integer value corresponding to the target feature points of the first image and the integer value corresponding to the target feature points of the second image.

17. The method according to claim 15, wherein the according to the weights, selecting target numbered feature points as target feature points of the image to be processed comprises:

selecting the target numbered feature points as the target feature points of the image to be processed in a descending order of the weights.

* * * * *